(12) United States Patent
Post et al.

(10) Patent No.: US 6,208,245 B1
(45) Date of Patent: Mar. 27, 2001

(54) ENGINE OIL CHANGE INDICATOR SYSTEM

(75) Inventors: Stephen F. Post, Walnut Creek, CA (US); Steven J. Lacker, Blauvelt, NY (US)

(73) Assignee: Curtis Instruments, Inc., Mt. Kisco, NY (US)

( * ) Notice: Subject to any disclaimer, the term of this patent is extended or adjusted under 35 U.S.C. 154(b) by 0 days.

(21) Appl. No.: 09/365,196

(22) Filed: Aug. 2, 1999

(51) Int. Cl.$^7$ ...................................... B60Q 1/00
(52) U.S. Cl. .................. 340/457.4; 340/457; 340/438; 340/450.3
(58) Field of Search ................. 340/457.4, 458, 340/457, 438, 449, 450.3; 307/118; 123/196 S

(56) References Cited

U.S. PATENT DOCUMENTS

| | | |
|---|---|---|
| 3,723,964 | 3/1973 | Lace . |
| 3,859,626 | 1/1975 | Baratti . |
| 4,007,629 | 2/1977 | Hochstein . |
| 4,299,307 * | 11/1981 | Scott ................................ 184/103 R |
| 4,551,703 | 11/1985 | Bourauel et al. . |
| 4,629,334 | 12/1986 | Hochstein . |
| 4,677,847 | 7/1987 | Sawatari et al. . |
| 4,706,193 | 11/1987 | Imago et al. . |
| 4,742,476 | 5/1988 | Schwartz et al. . |
| 4,796,204 | 1/1989 | Inoue . |
| 4,847,768 | 7/1989 | Schwartz et al. . |
| 4,862,393 | 8/1989 | Reid et al. . |
| 4,909,205 * | 3/1990 | Bewley, III ...................... 123/196 S |
| 5,060,156 * | 10/1991 | Vajgart et al. ................... 364/424.03 |
| 5,070,832 * | 12/1991 | Hapka et al. .................... 123/198 D |
| 5,203,429 * | 4/1993 | Zager ................................... 184/1.5 |
| 5,246,086 * | 9/1993 | Yunick ................................. 184/1.5 |
| 5,377,531 * | 1/1995 | Gomm ................................ 73/53.05 |
| 5,382,942 * | 1/1995 | Raffa et al. ........................ 340/457.4 |
| 5,633,796 * | 5/1997 | Cullen et al. ................... 364/424.035 |
| 5,749,339 * | 5/1998 | Graham et al. ................. 123/73 AD |
| 5,881,688 * | 3/1999 | Graham et al. ................. 123/73 AD |
| 5,970,942 * | 10/1999 | Kocherlein et al. ............. 123/196 R |

* cited by examiner

*Primary Examiner*—Jeffery Hofsass
*Assistant Examiner*—Toan Pham
(74) *Attorney, Agent, or Firm*—John H. Crozier

(57) ABSTRACT

In a preferred embodiment, an engine oil change indicator system, including: a combination engine oil pressure sensor and engine oil temperature sensor connected to a port on the engine to which port is normally connected an oil pressure switch; and a microprocessor connected to receive inputs from the combination engine oil pressure sensor and engine oil temperature sensor and to cause a low engine oil pressure warning light to be illuminated when the microprocessor has calculated from the inputs that the engine oil should be changed.

11 Claims, 2 Drawing Sheets

ENGINE OIL CHANGE INDICATOR SYSTEM

BACKGROUND OF THE INVENTION

1. Field of the Invention.

The present invention relates to engine lubricating oil generally and, more particularly, but not by way of limitation, to a novel system for indicating the need to change the engine lubricating oil.

2. Background Art.

Engine oil must be changed periodically to remove products of combustion that would damage the engine if such materials were allowed to accumulate over a relatively long period of time. Traditionally, engine oil was changed whenever the vehicle reached a predetermined mileage. Oftentimes, the vehicle manufacturer may suggest that the engine oil be changed more frequently if harsh driving conditions exist or if the engine oil has not been changed for some period of time. It is a relatively simple matter to rely on vehicle mileage to determine when to change the engine oil; however, the latter two situations require the operator of the vehicle to make a judgement as to when to change the engine oil. This judgement is really a guess, since the operator has no physical data on which to base the judgement. Unfortunately, guessing when to change the engine oil may result in changing the engine oil more frequently than is necessary, resulting in unnecessary expense, or, worse, not changing the oil frequently enough, resulting in shortened engine life.

There have been a number of attempts to provide more accurate indications that engine oil should be changed.

U.S. Pat. No. 3,723,964, issued Mar. 27, 1973, to Lace, and titled ENGINE CONDITION MONITORING APPARATUS, describes a system that produces two electrical signals representing engine oil pressure corrected for temperature and engine temperature corrected for ambient temperature and a third electrical signal representing engine speed. The first two signals are compared with the third signal and warnings given if either or both exceeds the third.

U.S. Pat. No. 3,859,626, issued Jan. 7, 1975, to Baratti, and titled VEHICLE ENGINE OIL TEMPERATURE PRESSURE AND METAL DETECTING DEVICE, describes a sensor that is screwed into the port which would otherwise receive the oil pressure switch. The sensor activates a light, which may be on the dashboard of the vehicle if the oil pressure is low, the oil temperature is high, or metallic particles are present.

U.S. Pat. No. 4,007,629, issued Feb. 15, 1977, to Hochstein, and titled METHOD AND APPARATUS FOR MONITORING OIL DEGRADATION, describes a method and apparatus for monitoring oil degradation which includes a "creep" material sensor that is in contact with the oil to act as an analog computer, in that the creep material changes in length in response to the temperature of the oil and the time at that temperature. The output of that sensor is summed with the output of a second sensor which computes the number of times the oil is heated to a temperature lower than the temperature required to disperse the oil, water, acid, and sludge contaminating the oil.

U.S. Pat. No. 4,551,703, issued Nov. 5, 1985, to Bourauel et al., and titled SERVICE INTERVAL SIGNALLING DEVICE FOR PRIME MOVERS, describes a system that provides a maintenance service interval signal based on the total number of revolutions of a rotary part of the prime mover and optionally one or more of (1) magnitude of load, (2) temperature of an operating fluid, (3) fuel consumption rate, and (4) time intervals.

U.S. Pat. No. 4,629,334, issued Dec. 16, 1986, to Hochstein, and titled ENGINE AND TRANSMISSION OIL DEGRADATION AND TEMPERATURE MONITOR, describes an engine or transmission oil degradation monitor that measures the change in resistivity of the oil corrected by temperature.

U.S. Pat. No. 4,677,847, issued Jul. 7, 1987, to Sawatari et al., and titled AUTOMOTIVE ENGINE OIL MONITORING SYSTEM, describes an engine oil deterioration monitor which provides a continuous output signal representing the remaining useful life, in terms of time or vehicle mileage, of the oil as a function of oil temperature or speed of the engine.

U.S. Pat. No. 4,706,193, issued Nov. 10, 1987, to Imajo et al., and titled OIL DEGRADATION WARNING SYSTEM, describes a monitor that provides a warning signal when motor oil is to be changed, the signal being based on degradation factors integrated over time, and the warning signal being postponed when oil is added. The degradation factors include (1) moved distance, (2) oil temperature, (3) engine speed, and (4) type of oil. In one embodiment, sensing lack of oil assumes an oil change and resets the system. In another embodiment, opening the hood and sensing lack of oil assumes an oil change. In a further embodiment, activation of a switch in the filler cap and low oil level assumes an oil change.

U.S. Pat. No. 4,742,476, issued May 3, 1988, to Schwartz et al., and titled AUTOMATIC ENGINE OIL CHANGE INDICATOR SYSTEM, describes a method of indicating when engine oil should be changed which computes an effective usage amount in relation to a measure of the actual engine usage and a penalty factor which operates to increase the effective usage amount when the engine operating conditions tend to cause an increased degradation of the engine oil, the penalty factor being determined as a sole function of the engine oil temperature. When accumulated computations reach a predetermined level, the operator is so advised.

U.S. Pat. No. 4,796,204, issued Jan. 3, 1989, to Inoue, and titled OIL DEGRADATION WARNING SYSTEM, describes an engine oil monitor that integrates oil temperature, engine speed, and engine load over time and provides an output indicating when at least one of the factors exceeds a predetermined value.

U.S. Pat. No. 4,847,768, issued Jul. 11, 1989, to Schwartz et al., and titled AUTOMATIC ENGINE OIL CHANGE INDICATOR SYSTEM, describes a method of indicating when engine oil should be changed based on equations which are combinations of engine operating parameters including a temperature term, without direct measurement of the engine temperature.

U.S. Pat. No. 4,862,393, issued Aug. 29, 1989, to Reid et al., and titled OIL CHANGE INTERVAL MONITOR, describes a diesel engine oil monitor that combines oil temperature, fuel flow, and volume of oil added to the engine since the last fuel change to compute the percentage of oil life used since the last oil change.

U.S. Pat. No. 5,060,156, issued Oct. 22, 1991, to Vajgart et al., and titled METHOD AND APPARATUS FOR DETERMINING ENGINE OIL CHANGE INTERVALS ACCORDING TO ACTUAL ENGINE USE, describes a monitor which calculates when the engine oil is exhausted by multiplying each spark plug pulse by weighting factors that are periodically determined by sampling engine oil temperature and length of time the engine has been in continuous use above a predetermined speed.

U.S. Pat. No. 5,382,942, issued Jan. 17, 1995, to Raffa et al., and titled ENGINE OIL MONITORING SYSTEM HAVING AN IN-VEHICLE DISPLAY OF THE CURRENT STATUS OF THE OIL, describes an oil monitoring system that calculates and displays as remaining percent oil life (1) the remaining percent tachometer oil life, (2) remaining percent time oil life, and (3) remaining percent odometer oil life. The system receives as an input the type of fuel and may include an oil dielectric constant sensor.

U.S. Pat. No. 5,633,796, issued May 27, 1997, to Cullen et al., and titled METHOD AND APPARATUS FOR INFERRING ENGINE OIL TEMPERATURE FOR USE WITH AN OIL CHANGE INDICATOR, states that the use of an oil temperature sensor adds cost and is not always accurate. Accordingly, in the described system, an electronic engine controller infers the instantaneous temperature of engine oil from other factors and then determines an oil change interval as a function of inferred oil temperature and the number of engine revolutions. A steady state oil temperature value is determined as a function of engine speed and aircharge, an oil temperature time constant is determined as a function of mass air flow rate, and the instantaneous oil temperature is determined as a function of the steady state oil temperature and the oil temperature time constant.

Most of the foregoing systems are complicated and relatively costly and none is easily and quickly retrofittable to an existing engine.

Accordingly, it is a principal object of the present invention to provide an engine oil change indicator system that is simple.

It is a further object of the invention to provide such a system that is economical.

It is an additional object of the invention to provide such a system that is easily and quickly retrofittable to an existing engine.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an engine oil change indicator system, comprising: a combination engine oil pressure sensor and engine oil temperature sensor connected to a port on said engine to which said port is normally connected an oil pressure switch; and a microprocessor connected to receive inputs from said combination engine oil pressure sensor and engine oil temperature sensor and to cause a low engine oil pressure warning light to be illuminated when said microprocessor has calculated from said inputs that said engine oil should be changed.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
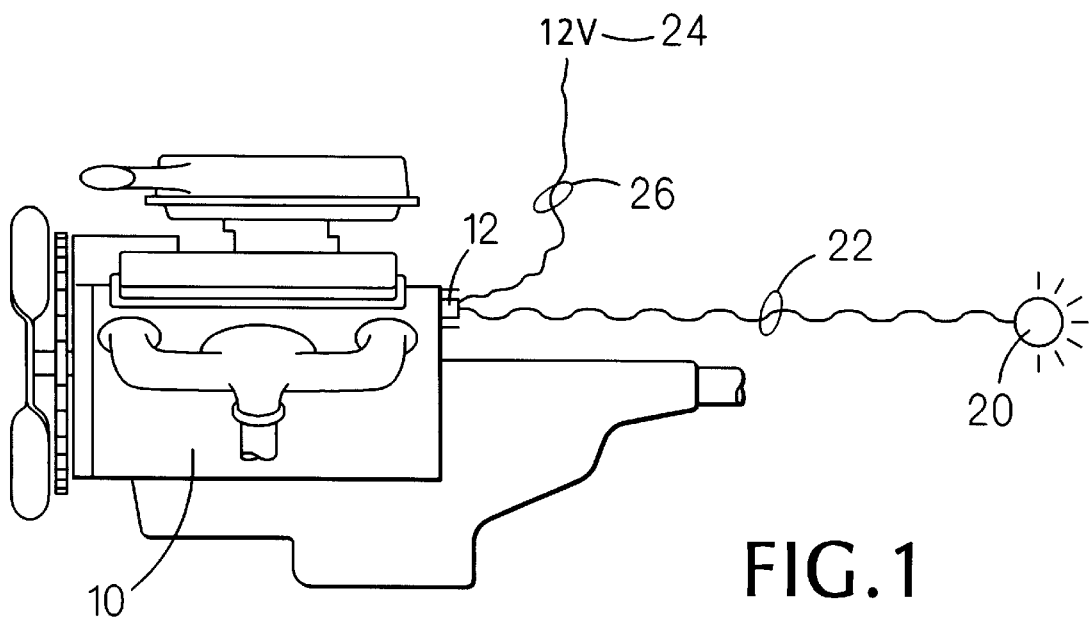
FIG. 1 is a side elevational view of an engine and indicator light, employing one embodiment of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

The present invention employs the system described in the above U.S. Pat. No. 4,742,476, issued May 3, 1988, to Schwartz et al., and titled AUTOMATIC ENGINE OIL CHANGE INDICATOR SYSTEM, the disclosure of which patent is incorporated by reference hereinto. As is noted above, this patent describes a method of indicating when engine oil should be changed which computes an effective usage amount in relation to a measure of the actual engine usage and a penalty factor which operates to increase the effective usage amount when the engine operating conditions tend to cause an increased degradation of the engine oil, the penalty factor being determined as a sole function of the engine oil temperature. When accumulated computations reach a predetermined level, the operator is so advised.

While the preferred embodiment described in the referenced patent uses engine revolutions to determine engine usage, the present invention employs engine on-time to determine engine usage.

The referenced patent discusses engine oil degradation and notes that excessive degradation of the engine oil occurs at its temperature extremes. At high oil temperatures, antioxidants in the oil tend to become depleted, leading to the oil becoming more viscous and acidic, due to oxidation and nitration. In addition, insoluble particles are deposited on the engine surfaces as a varnish or sludge at high oil temperatures. At low oil temperatures, fuel, water, and soot tend to accumulate in the oil, reducing its viscosity and increasing wear. In addition, acids produced by incomplete combustion reduce the ability of the oil to prevent rust and corrosion at low oil temperatures.

Referring to FIG. 1 there is illustrated an engine 10 having inserted in its oil pressure switch port a sensor/control module 12 according to one embodiment of the present invention. Sensor/control module 12 is connected to an indicator light 20 by wire 22 and is connected to a source of electrical power 24 by wire 26, in this case the source of electrical power being the battery of the vehicle (not shown) in which engine 10 is installed. Indicator light 20 is typically located in the operating compartment of the vehicle and usually is located in the dashboard of the vehicle.

It will be recognized that the system shown on FIG. 1 is identical in appearance to the low-oil-pressure warning system found on most, if not all, engines. That is, the oil pressure switch is connected to a low-oil-pressure warning light and to a source of electrical power. This feature makes the present invention eminently well suited to retrofitting to an existing engine. A relatively unskilled person can simply disconnect existing wires 22 and 26, remove the oil pressure switch from its port in engine 10, install sensor/control module 12 in the oil pressure switch port, and reconnect the wires. In most modern vehicles, wires 22 and 26 would not be provided as the separate wires shown, but would comprise a portion of a wiring harness with a connector disposed at the end thereof for connection to the oil pressure switch. An employee at a fast oil change shop would easily have the skills to install sensor/control module 12. There is no need to make a separate connection to electrical power and no need to install anything in the operating compartment of the vehicle or to break through the firewall of the vehicle to install wiring.

Figure 2:
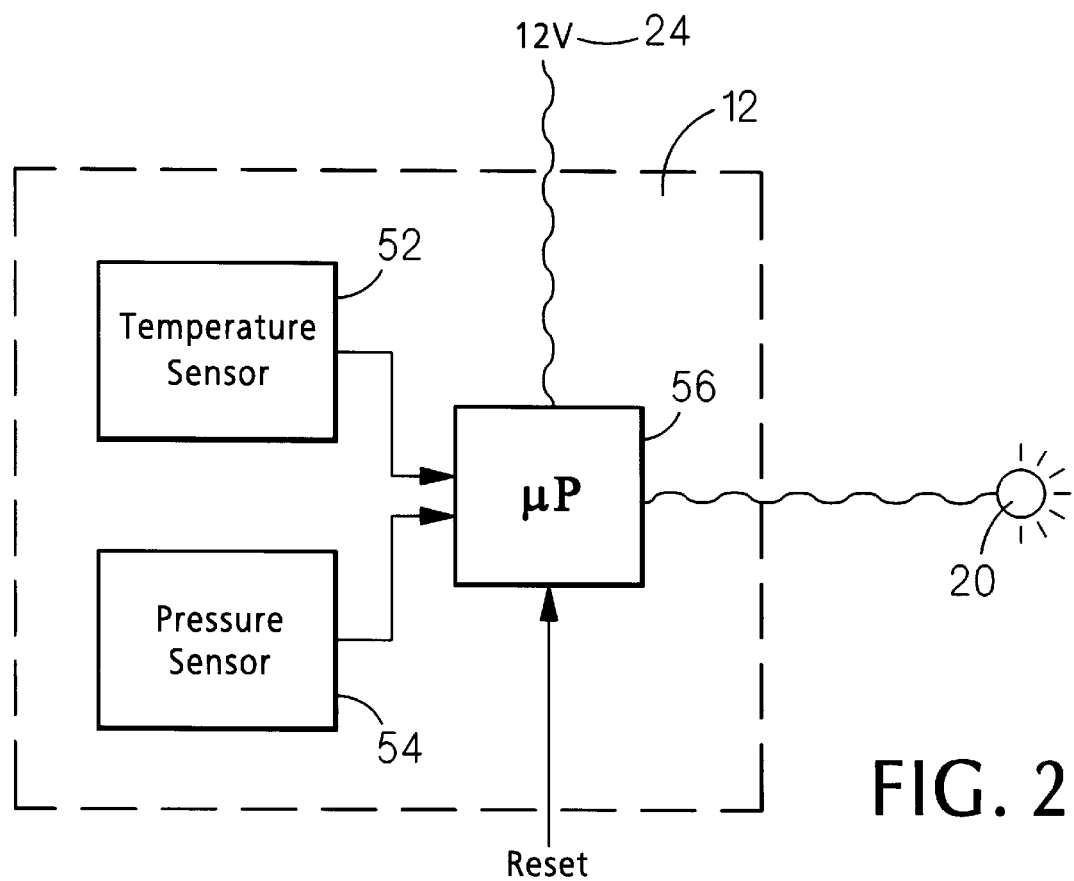
FIG. 2 is a block/schematic diagram of the elements of the sensor/control module of the present invention and an indicator light.

FIG. 2 illustrates the elements of sensor/control module 12 which include an oil temperature sensor 52, an oil pressure sensor 54, and a microprocessor 56 having a non-volatile memory and a clock. Microprocessor 56 receives inputs from sensors 52 and 54 and is connected to source of electrical power 24. Microprocessor 56 also receives (or generates) a reset signal and is connected to operate indicator light 20.

In operation, there is stored in the non-volatile memory of microprocessor 56 the maximum oil change interval in terms of time. Whenever engine 10 (FIG. 1) is operating, as detected by oil pressure sensed by oil pressure sensor 54, microprocessor will periodically multiply a time interval by a factor representing the engine oil temperature during that time interval, as detected by oil temperature sensor 52 and decrement the same from the maximum oil change interval, or from a previously decremented oil change interval, and store the result in memory. When the oil temperature is in the optimum operating range, the multiplying factor may be unity. However, when the oil temperature is either above or below the optimum operating range, the multiplying factor may be greater than unity, the actual factors used being determined experimentally.

When the decremented oil change interval reaches zero or some predetermine percentage of the maximum oil change interval, microprocessor 56 causes indicator light 20 to flash for a period of time. Indicator light 20 is caused to flash for only a limited period of time, say, for two minutes, for example, so that it does not become a distraction to the operator of the vehicle. However, indicator light 20 will flash for the predetermined period of time whenever the ignition switch is turned on. Resetting of microprocessor 56 after an engine oil change could be accomplished, for example, by switching the ignition key between ON and OFF three times in five seconds which would be sensed by the microprocessor, or by pressing a button (not shown) on sensor/control module 12, or by other convenient means.

Whenever oil pressure sensor 54 detects a low level of oil pressure, microprocessor 56 causes indicator light 20 to be solidly illuminated, as is the case with existing systems.

Figure 3:
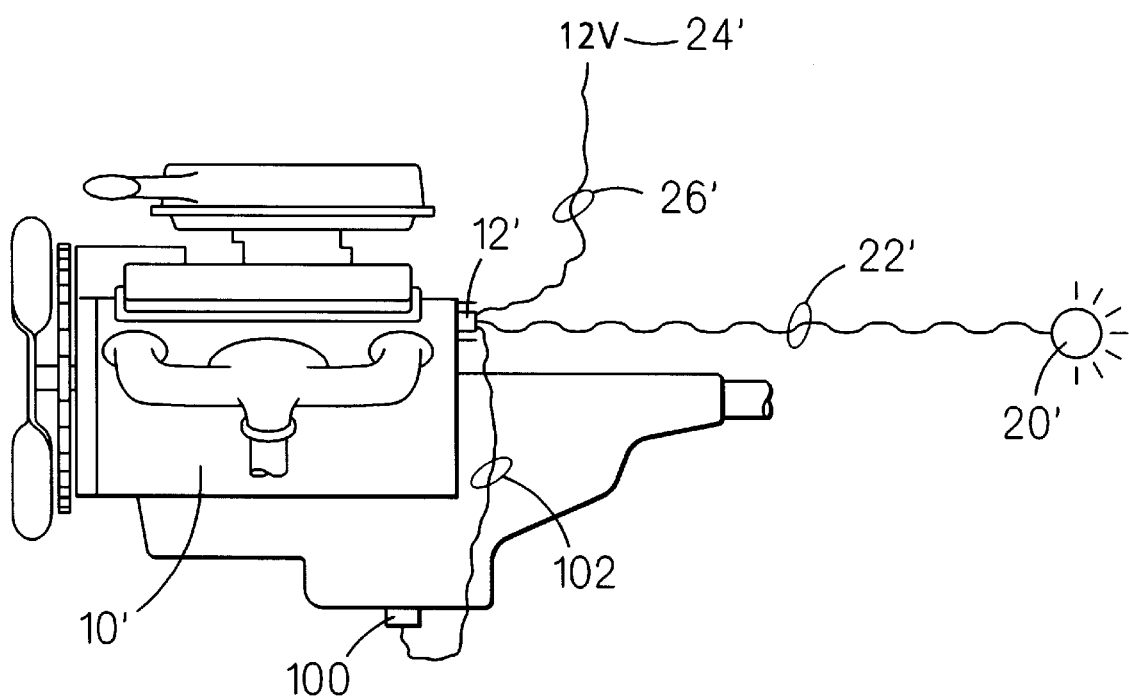
FIG. 3 is a side elevational view of an engine and indicator light, employing another embodiment of the present invention.

FIG. 3 illustrates another embodiment of the invention. Elements having structure or function similar to the elements shown on FIG. 1 are given primed reference numerals. The system shown on FIG. 3 operates the same as that described with reference to FIG. 2; however, in this case, the temperature sensing element is disposed in the oil drain plug 100 which is connected to sensor/control module 12' by means of a wire 102. This system is somewhat more complicated to install than the system shown on FIG. 1; however, it does have one advantage over that system. The advantage is that the resetting of microprocessor 56 can be accomplished automatically by the breaking of a ground connection when oil drain plug 100 is removed. Therefore, no positive action needs to be taken to reset microprocessor 56.

Again, the systems of the present invention are easily retrofitted to an existing engine installed in an existing vehicle and the elements of the systems are relatively inexpensive.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An engine oil change indicator system, comprising:
   (a) a combination engine oil pressure sensor and engine oil temperature sensor connected to a port on said engine to which said port is normally connected an oil pressure switch; and
   (b) a microprocessor connected to receive inputs from said combination engine oil pressure sensor and engine oil temperature sensor and to cause a low engine oil pressure warning light to be illuminated when said microprocessor has calculated from said inputs that said engine oil should be changed.

2. An engine oil change indicator system, as defined in claim 1, wherein: said microprocessor causes said low engine oil pressure warning light to flash when said microprocessor has calculated that said engine oil should be changed and causes said low engine oil pressure warning light to be solidly illuminated when said input from said engine oil pressure sensor indicates that pressure of said engine oil is low.

3. An engine oil change indicator system, as defined in claim 1, further comprising: said engine oil temperature sensor is disposed in an oil drain plug and said oil drain plug is adapted to reset said oil change indicator system when said oil drain plug is removed.

4. An engine oil change indicator system, comprising:
   (a) an engine oil pressure sensor connected to a port on said engine to which said port is normally connected an engine oil pressure switch;
   (b) an engine oil temperature sensor connected to a port on said engine to which said port is normally connected an engine oil drain plug; and
   (c) a microprocessor connected to receive inputs from said engine oil pressure sensor and said engine oil temperature sensor and to cause a low engine oil pressure warning light to be illuminated when said microprocessor has calculated from said inputs that said engine oil should be changed.

5. An engine oil change indicator system, as defined in claim 4, wherein: said microprocessor causes said low engine oil pressure warning light to flash when said microprocessor has calculated that said engine oil should be changed and causes said low engine oil pressure warning light to be solidly illuminated when said input from said oil pressure sensor indicates that pressure of said engine oil is low.

6. A method of indicating when a service interval for changing engine oil has expired, comprising:
- (a) determining a maximum engine operating interval and storing the same;
- (b) determining engine operating time;
- (c) periodically multiplying an increment of engine operating time by a factor related to temperature of said engine oil during said increment of engine operating time, said factor being determined by level of temperature of said engine oil, to determine effective engine usage;
- (d) decrementing said maximum engine operating interval by said effective engine usage and storing the same;
- (e) repeating steps (b) through (d) for successive increments of engine operating time, while decrementing previously stored engine operating interval in step (d); and
- (f) causing a low engine oil pressure warning light to flash indicating when a current stored engine operating interval equals a predetermined percentage of said maximum operating interval.

7. A method of indicating when a service interval for changing engine oil has expired, as defined in claim 6, wherein: step (b) comprises determining when engine oil pressure is present.

8. An method of indicating when a service interval for changing engine oil has expired, as defined in claim 6, further comprising:
- (g) resetting said signal by removing an oil drain plug from said engine.

9. A method of retrofitting an engine oil service interval indicating system to an existing engine in an existing vehicle, said method comprising:
- (a) disconnecting existing wiring from an existing engine oil pressure switch on said engine;
- (b) removing said existing engine oil pressure switch from an engine oil pressure switch port on said engine;
- (c) installing in said engine oil pressure switch port a sensor/control module;
- (d) connecting said existing wiring to said sensor/control module; and
- (e) providing said sensor/control module arranged to output a signal on said existing wiring indicating when said engine oil service interval has expired.

10. A method of retrofitting an engine oil service interval indicating system to an existing engine in an existing vehicle, as defined in claim 9, wherein: said sensor/control module includes an engine oil pressure sensor and said method further comprises:
- (a) replacing an existing engine oil drain plug on said existing engine with an engine oil drain plug containing a temperature sensor; and
- (b) connecting said engine oil drain plug containing a temperature sensor to said sensor/control module.

11. A method of retrofitting an engine oil service interval indicating system to an existing engine in an existing vehicle, as defined in claim 10, wherein: subsequent removing and replacing of said engine oil drain plug resets said sensor/control module.

* * * * *